United States Patent [19]

Rimington et al.

[11] 3,862,312

[45] Jan. 21, 1975

[54] COMPOSITIONS COMPRISING A RESINATE OF DL- OR L-TETRAMISOLE, AND TREATMENT THEREWITH

[75] Inventors: Irene Lesley Rimington; Michael Dudley Ward, both of Macclesfield, England

[73] Assignee: Imperial Chemical Industries Limited, London, England

[22] Filed: Oct. 22, 1970

[21] Appl. No.: 83,205

Related U.S. Application Data

[62] Division of Ser. No. 785,775, Dec. 20, 1968, Pat. No. 3,574,227.

[30] Foreign Application Priority Data

Jan. 8, 1968  Great Britain ...................... 1056/68

[52] U.S. Cl. ..................... 424/79, 424/78, 424/270
[51] Int. Cl. .......................................... A61k 27/00

[58] Field of Search ................................ 424/78, 79

[56] References Cited
UNITED STATES PATENTS

| | | | |
|---|---|---|---|
| 3,053,733 | 9/1962 | Chance et al. ........................ | 424/79 |
| 3,143,465 | 8/1964 | Keating ................................ | 424/79 |
| 3,313,686 | 4/1967 | Bryan et al. ......................... | 424/79 |
| 3,629,392 | 12/1971 | Banker et al. ....................... | 424/78 |

*Primary Examiner*—Sam Rosen
*Attorney, Agent, or Firm*—Cushman, Darby & Cushman

[57] ABSTRACT

The disclosure concerns virtually tasteless salts of dl-tetramisole and l-tetramisole, a process for preparing said salts, and pharmaceutical and veterinary compositions comprising them. A representative salt is di-dl-tetramisole embonate.

2 Claims, No Drawings

COMPOSITIONS COMPRISING A RESINATE OF DL- OR L-TETRAMISOLE, AND TREATMENT THEREWITH

This is a division of our co-pending application, Ser. No. 785,775, filed Dec. 20, 1968 and issued as U.S. Pat. 3,574,227 on Apr. 6, 1971.

This invention relates to new acid-addition salts of tetramisole which are useful anthelmintic agents and which are virtually tasteless.

In United Kingdom Pat. No. 1,043,489 there are described and claimed inter alia therapeutically acceptable acid-addition salts of dl-2,3,5,6-tetrahydro-6-phenylimidazo[2,1-b]thiazole (for convenience hereinafter this base will be referred to as dl-tetramisole), and it is indicated that these salts are useful as anthelmintic agents. It is also known that l-tetramisole (i.e. laevorotatory tetramisole) is approximately twice as active as dl-tetramisole as an anthelmintic agent. The said specification No. 1,043,489 discloses acid-addition salts of dl-tetramisole derived from relatively common inorganic and organic acids; namely, hydrochloric, hydrobromic, hydriodic, sulphuric, nitric, thiocyanic, phosphoric, acetic, propionic, glycolic, lactic, pyruvic, oxalic, malonic, succinic, maleic, fumaric, malic, tartaric, citric, benzoic, cinnamic, mandelic, methanesulphonic, ethanesulphonic, hydroxyethanesulphonic, benzenesulphonic, p-toluenesulphonic, salicylic, p-aminosalicyclic, 2-phenoxybenzoic and 2-acetoxybenzoic acids. However, there is no disclosure in the said specification of acid-addition salts derived from 1,1-methylene-bis-2-hydroxy-3-naphthoic acid (hereinafter called "embonic acid") or from an acidic synthetic resin.

dl-Tetramisole and acid-addition salts derived from relatively common inorganic and organic acids, for example hydrochloric, propionic, stearic, cinnamic and 3-hydroxy-2-naphthoic acid, have an intensely bitter taste. Furthermore, it has been found difficult to administer dl-tetramisole hydrochloride at a satisfactory dose level to cattle because of its bitter taste. It has not been found possible to disguise this bitter taste by means of flavouring agents or other veterinary additives. We have found that the acid-addition salts of dl- and l-tetramisole with embonic acid or a sulphonated cross-linked polystyrene resin are virtually tasteless, and therefore these new salts do not have the disadvantage of the known salts.

According to the invention we provide acid-addition salts wherein the basic part is dl- or l-tetramisole and the acidic part is embonic acid or a sulphonated cross-linked polystyrene resin.

As a suitable resin there may be mentioned, for example, "Zeo-Karb" 225 or "Amberlite" IR 120 ("Zeo-Karb" and "Amberlite" are trade marks).

According to a further feature of the invention we provide a process for the manufacture of the acid-addition salts of the invention, which comprises reacting dl- or l-tetramisole, or an acid-addition salt thereof with a relatively common inorganic acid, either with embonic acid or an alkali metal salt thereof, or with a sulphonated cross-linked polystyrene resin.

The acid-addition salt of dl- or l-tetramisole which may be used as a reactant may be, for example, the hydrochloride. The process of the invention is conveniently carried out in an aqueous medium, for example water or aqueous methanol, at approximately ambient temperature.

According to a further feature of the invention we provide pharmaceutical and veterinary compositions comprising an acid-addition salt wherein the basic part is dl- or l-tetramisole and the acidic part is embonic acid or a sulphonated cross-linked polystyrene resin, and an inert, non-toxic diluent or carrier.

The compositions of the invention may be in any conventional form suitable for administration to man or to animals. Thus, for example, the pharmaceutical compositions include tablets and capsules, and the veterinary compositions include premix formulations intended for addition to animal foodstuffs. The pharmaceutical and veterinary compositions of the invention contain conventional diluents or carriers, and they may be obtained by conventional procedures.

The invention is illustrated but not limited by the following examples:

EXAMPLE 1

A solution of disodium embonate (141g.) in water (1.5 l.) was slowly added to a solution of dl-tetramisole hydrochloride (157g.) in aqueous methanol (1:1; 2 l.). The resulting mixture was filtered, and the solid residue was dried. There was thus obtained di-dl-tetramisole embonate, m.p.194°–196°C.

EXAMPLE 2

A solution of dl-tetramisole hydrochloride (30g.) in water (200ml.) was slowly passed through a column of sulphonated cross-linked polystyrene resin ("Zeo-Karb" 225; 60g.). The resin particles comprising the column were then dried. There was thus obtained a salt of dl-tetramisole with a sulphonated cross-linked polystyrene resin, said salt having a dl-tetramisole content of 47.4% by weight.

EXAMPLE 3

Sulphonated cross-linked polystyrene resin ("Amberlite" IR 120; 12g.) was added to a solution of l-tetramisole hydrochloride (4.3g.) in water (50ml.), and the mixture was shaken for 2 minutes. The mixture was then filtered, and the solid residue (resin particles) was dried. There was thus obtained a salt of l-tetramisole with a sulphonated cross-linked polystyrene resin, said salt having a l-tetramisole content of 34.2% by weight.

EXAMPLE 4

Di-dl-tetramisole embonate (10g.) was thoroughly mixed with lactose (90g.) to give a premix suitable for mixing with an animal foodstuff for anthelmintic purposes.

EXAMPLE 5

Finely ground Di-dl-tetramisole embonate (14.35g.) and lactose powder (59.5g.) were thoroughly mixed together. An aqueous solution of acacia (20% w/v; 10ml.) was added to the resulting mixture, and the whole was thoroughly mixed. The resulting wet mass was broken down into granules by passage through an 8 mesh screen, and the granules were dried at 60°C. The resulting granules were suitable for mixing with cattle foodstuff for anthelmintic purposes.

The acid-addition salts of this invention exhibit anthelmintic activity in standard experimental animals (mice) in an art-recognised test. The said salts are generically useful as anthelmintic agents in the treatment of warm-blooded animals (including man, and domestic animals, for example cattle, sheep, pigs and horses and the like, and poultry, including game birds). For this purpose we recommend that the salts be administered as indicated below (in all cases the doses, weights, and percentages are expressed in terms of the active base itself, i.e. dl-tetramisole or l-tetramisole):

I. Human use a. Di-dl-tetramisole embonate. A single oral dose of 0.5–20mg./kg.

b. Salt of dl-tetramisole with a non-toxic, pharmaceutically-acceptable, sulphonated cross-linked polystyrene resin. A single oral dose of 0.5–25mg./kg.

c. Di-l-tetramisole embonate. A single oral dose of 0.5–25mg./kg.

d. Salt of l-tetramisole with a non-toxic, pharmaceutically-acceptable, sulphonated cross-linked polystyrene resin. A single oral dose of 0.25–10mg./kg.

In each case the salt can be administered in conventional oral unit dosage form, for example a tablet or capsule.

II. Veterinary use a. Di-dl-tetramisole embonate.
  i. Cattle and sheep—A single oral dose of 10–20mg./kg. (given in the form of ca. 10% w/w feed granules or a ca. 3% w/w aqueous drench).
  ii. Pigs—A single oral dose of 10–20mg./kg. (given in the form of ca. 10% w/w feed granules).

b. Salt of dl-tetramisole with a non-toxic, pharmaceutically-acceptable, sulphonated cross-linked polystyrene resin.
  i. Cattle and sheep—A single oral dose of 15–30mg/kg. (given in the form of 10% w/w feed granules or a ca. 3% w/w aqueous drench).
  ii. Pigs—A single oral dose of 15–30mg./kg. (given in the form of ca. 10% w/w feed granules).

c. Di-l-tetramisole embonate.
  i. Cattle and sheep—A single oral dose of 5–40mg./kg. (given in the form of ca. 5% w/w feed granules or a ca. 1.5% w/w aqueous drench). Alternatively, a single subcutaneous injection of a ca. 7.5% w/w sterile suspension at ca. 5ml./cwt.
  ii. Pigs and horses—A single oral dose of 5–40mg./kg. (given in the form of ca. 5% w/w feed granules).
  iii. Poultry—An oral dose of 20–180mg./kg. (given in the drinking water).

d. Salt of l-tetramisole with a non-toxic, pharmaceutically-acceptable, sulphonated cross-linked polystyrene resin.
  i. Cattle and sheep—A single oral dose of 5–10 mg./kg. (given in the form of ca. 5% w/w feed granules or a ca. 1.5% w/w aqueous drench). Alternatively, a single subcutaneous injection of a ca. 7.5% w/w sterile suspension at ca. 5ml./cwt.
  ii. Pigs and horses—A single oral dose of 5–10mg./kg. (given in the form of ca. 5% w/w feed granules).
  iii. Poultry—An oral dose of 15–40mg./kg. (given in the drinking water).

What we claim is:

1. A method for treating a host suffering from a helminth infestation, which comprises administering to said host an anthelmintically effective amount of an acid-addition salt wherein the basic part is selected from the group consisting of dl-tetramisole and l-tetramisole, and wherein the acidic part is a non-toxic, pharmaceutically-acceptable, sulphonated, cross-linked polystyrene resin.

2. A pharmaceutical or veterinary composition comprising, as the active ingredient, an effective amount of an acid-addition salt wherein the basic part is selected from the group consisting of dl-tetramisole and l-tetramisole, and wherein the acidic part is a non-toxic, pharmaceutically-acceptable, sulphonated, cross-linked polystyrene resin, together with a major amount of an inert, non-toxic carrier.

* * * * *